United States Patent [19]

Steigerwald et al.

[11] Patent Number: 5,073,848
[45] Date of Patent: Dec. 17, 1991

[54] POWER DISTRIBUTION SYSTEM

[75] Inventors: Robert L. Steigerwald, Burnt Hills, N.Y.; Peter M. Koninsky, Mount Laurel; Gerhard A. Franz, Princeton, both of N.J.

[73] Assignee: General Electric Company, Schenectady, N.Y.

[21] Appl. No.: 616,965

[22] Filed: Nov. 21, 1990

[51] Int. Cl.$^5$ ............................................ H02M 3/335
[52] U.S. Cl. ........................................ 363/65; 307/82; 307/29
[58] Field of Search ............... 363/16, 65, 71; 307/29, 307/31, 82, 85, 86, 11, 12, 13, 16; 323/267, 269, 272

[56] References Cited

U.S. PATENT DOCUMENTS

| | | | |
|---|---|---|---|
| 3,229,164 | 1/1966 | McCartney et al. | 307/29 |
| 3,261,980 | 7/1966 | McCartney et al. | 307/86 |
| 4,386,394 | 5/1983 | Kocher et al. | 363/20 |
| 4,508,996 | 4/1985 | Clegg et al. | 315/224 |

OTHER PUBLICATIONS

Abraham I. Pressman, Switching and Linear Power Supply, Power Converter Design, Hayden Book Co., Inc., 1977, pp. 183-185.

*Primary Examiner*—Peter S. Wong
*Attorney, Agent, or Firm*—Jill M. Breedlove; James C. Davis, Jr.; Marvin Snyder

[57] ABSTRACT

A power distribution system for supplying power to a plurality of point-to-load power supplies includes a plurality of bulk power supplies, each having a separate respective power distribution bus coupled at the output thereof. Each power distribution bus is coupled to each point-of-load power supply through an OR gate such that if one or more of the bulk power supplies fails, or if a fault occurs on one or more of the power distribution buses, then the point-of-load power supplies are unaffected because they continue to receive power from the other bulk power supplies via the respective OR gates. Furthermore, if a power distribution bus becomes short-circuited to ground, the current therein is limited electronically by the respective bulk power supply. Hence, the power distribution buses are protected against overcurrent without the need for a multitude of dc circuit breakers.

4 Claims, 2 Drawing Sheets

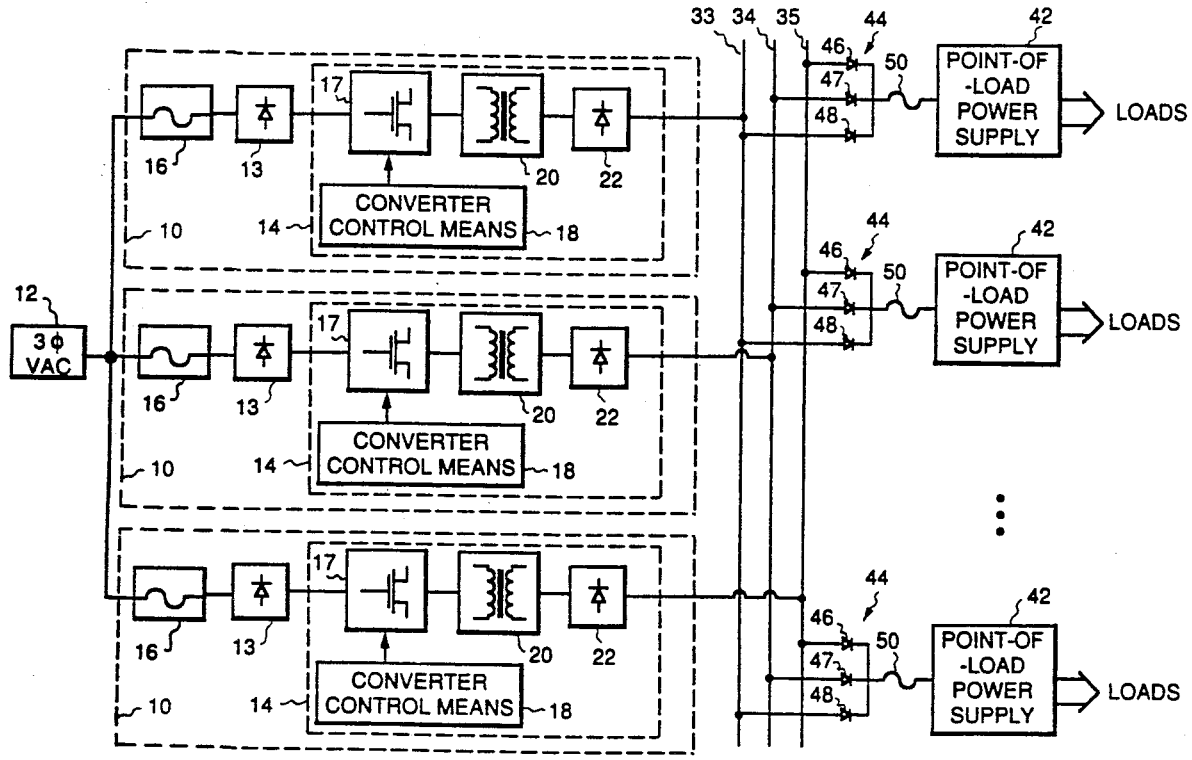

POWER DISTRIBUTION SYSTEM

FIELD OF THE INVENTION

The present invention relates generally to power distribution systems and, more particularly, to a power distribution system suitable for use in an electronic system having widely dispersed loads, such as a phased-array radar system or a VLSI system.

BACKGROUND OF THE INVENTION

In an exemplary power distribution system, a single, relatively high-power supply (hereinafter referred to as a bulk power supply) converts input line voltage to a semi-regulated voltage which is then supplied to a multitude of individual point-of-load power supplies located at the loads to be served. For some applications, power is distributed to the point-of-load power supplies along the back-plane of a modular assembly, and, in such case, the bulk power supply is often referred to as a back-plane power supply. The bulk power supply has its input derived from a prime ac power source which may exhibit substantial voltage transients.

In an electronic system having widely dispersed loads, such as a phased-array radar system or a VLSI system, wherein a single bulk power supply is used, large distribution buses and large energy storage capacitors are required throughout the system in order to maintain voltage regulation. For relatively low load voltages, even larger distribution buses are needed because the power buses must carry higher currents, and even larger energy-storage capacitors are needed.

Although most power distribution systems employ a single bulk power supply to serve the total load, a more recent approach to power distribution involves several bulk power supplies coupled in a parallel relationship so that if one of the bulk power supplies fails, then the other parallel-coupled bulk power supplies provide power to the load. Advantageously, such an arrangement enables the use of smaller distribution buses and energy-storage capacitors because the power supplies are in closer proximity to the respective loads which they serve. Disadvantageously, however, using this approach requires a multitude of dc circuit breakers to protect wiring in the event of a short circuit, and, unfortunately, such dc circuit breakers can be problematic at very high dc bus voltages.

OBJECTS OF THE INVENTION

Accordingly, an object of the present invention is to provide a new and improved power distribution system.

Another object of the present invention is to provide a power distribution system for providing highly regulated power to a distributed load which does not require large distribution buses or large energy-storage capacitors, even at relatively low dc load voltages.

Still another object of the present invention is to provide a power distribution system for providing highly regulated power to a distributed load with a minimal number of circuit breakers.

SUMMARY OF THE INVENTION

The foregoing and other objects of the present invention are achieved in a power distribution system for supplying power to a plurality of point-of-load power supplies, which system includes a plurality of bulk power supplies, each having a separate respective power distribution bus coupled at the output thereof. Each power distribution bus is coupled to each point-of-load power supply through OR gate means such that if one or more of the bulk power supplies fails, then the point-of-load power supplies are unaffected because they continue to receive power from the other bulk power supplies via the OR gate means. Furthermore, if a fault occurs on any of the power distribution buses, then the point-of-load power supplies likewise remain unaffected. Still further, if a power distribution bus becomes short-circuited to ground, the current therein is limited by the respective bulk power supply. Hence, the power distribution buses are protected against overcurrents without the need for a multitude of dc circuit breakers.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
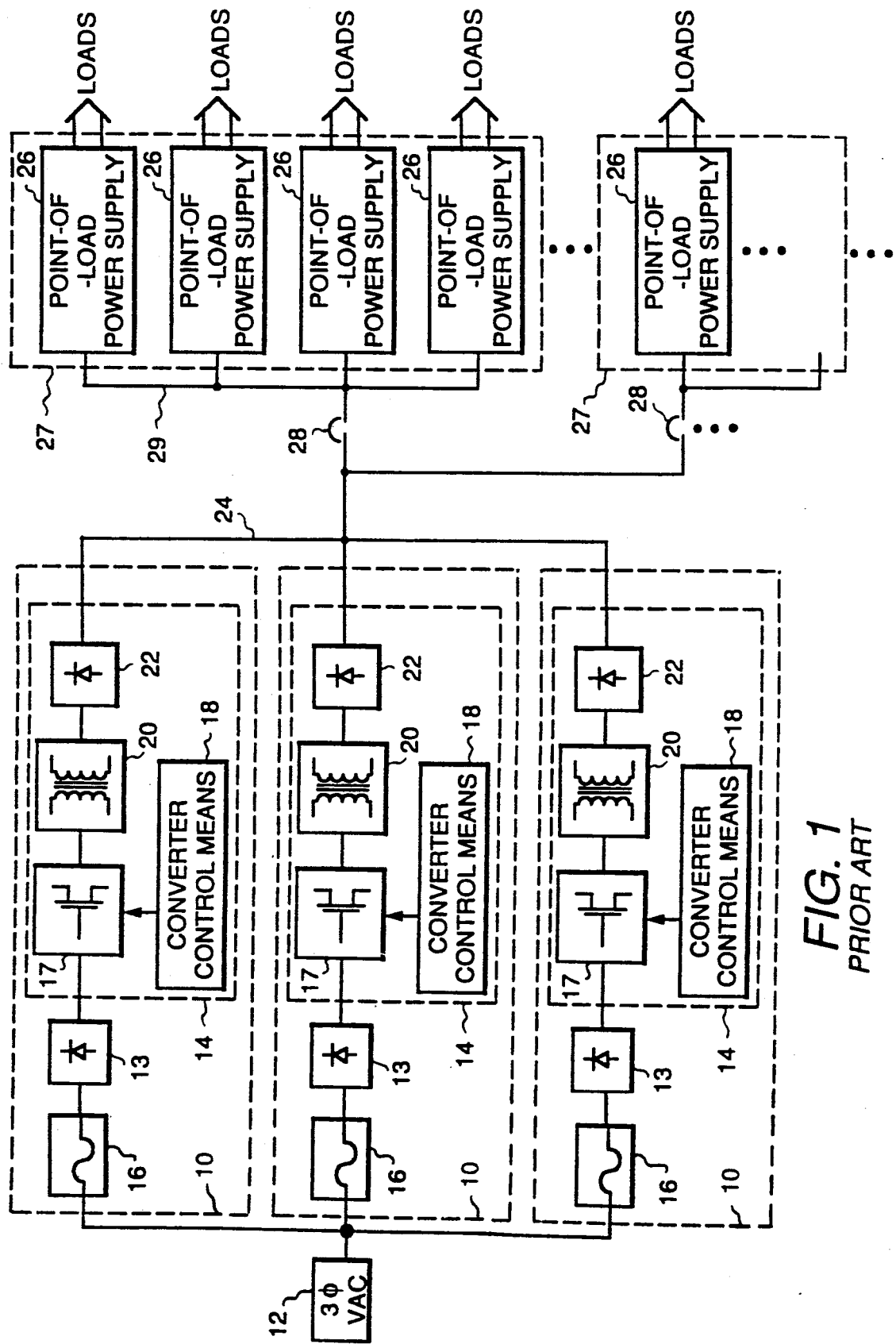
FIG. 1 is a schematic illustration of a power distribution system of the prior art.

FIG. 1 illustrates a power distribution system of the prior art wherein a plurality of bulk power supplies 10, each comprising an ac-to-dc converter and receiving power from a single-phase or polyphase ac line, are coupled in a parallel relationship such that if one of the bulk power supplies 10 fails, then the other bulk power supplies provide power to the load. Such a power distribution system is suitable for use in systems serving widely dispersed loads, such as a phased-array radar system or a VLSI system. By way of illustration, three bulk power supplies 10 are shown in FIG. 1 as receiving input power from a three-phase prime ac power source 12. As shown, an input rectifier 13 receives ac power from source 12 via fuses 16. The rectified signal from input rectifier 13 is supplied to dc-to-dc converter 14 which is illustrated in FIG. 1 as including a switching device stage 17, e.g. a full-bridge or half-bridge connection of switching defices, for receiving the rectified signal from input rectifier 13. Switching defice stage 13 is coupled to a control means 18 for controlling the switching devices thereof to operate in a pulse width modulation mode in a well-known fashion. the output signal from switching device stage 17 is rectified by an output rectifier 22 via an isolation transformer 20.

The output of each bulk power supply 10 is respectively coupled to a single power distribution bus 24 which, in turn, is coupled to a plurality of point-of-load power supplies 26. For purposes of illustration, the point-of-load power supplies are shown in groups 27 of four supplies each, which may be a suitable arrangement for a phased-array radar system, or example. Disadvantageously, a multitude of dc circuit breakers 28 are needed to protect the circuit wiring in the event of a short circuit of local distribution bus 29 to ground. That is, if a fault occurs on the local distribution bus, load current is supplies by all of the bulk power supplies 10, resulting in an undesirable temperature rise in the circuit conductors. Furthermore, such dc circuit breakers tend to be problematic at very high distribution bus voltages because the current does not pass through zero periodically as in an ac a system, with the result that the arc established across open dc contacts can be difficult to extinguish reliably at higher dc voltages. However, without the dc circuit breakers, the circuit wires would have to be too large to be practical.

Figure 2:
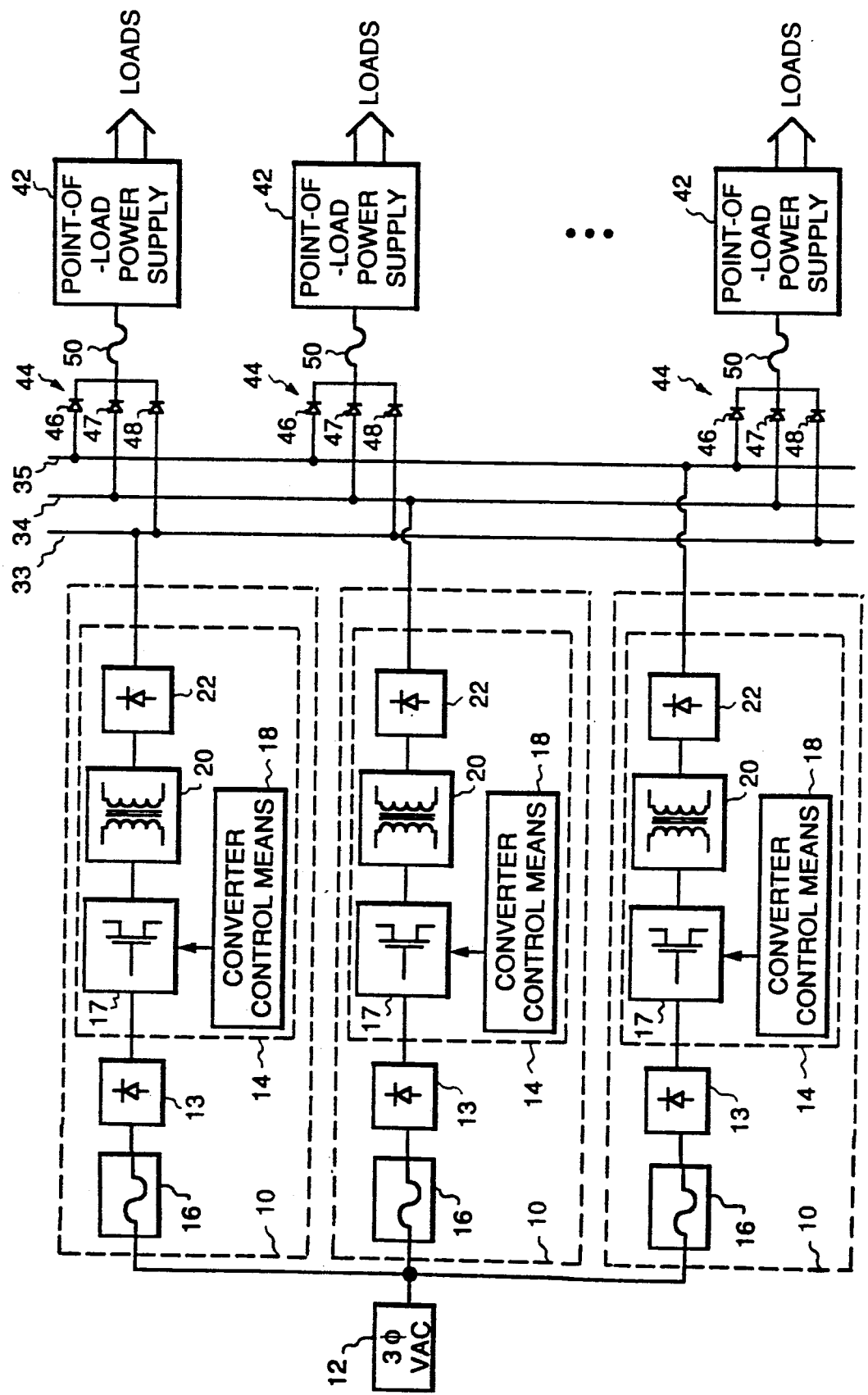
FIG. 2 is a power distribution system according to the present invention.

FIG. 2 illustrates a power distribution system in accordance with the present invention wherein a plurality of bulk power supplies 10, each comprising an ac-to-dc converter, each has its respective output coupled to a separate dc power distribution bus 33-35, respectively. By way of illustration, as in FIG. 1, three bulk power supplies 10 are shown as receiving power from a three-phase prime ac power source 12. It is to be understood, however, that the principles of the present invention apply equally to distribution systems receiving power from a dc source; in such cases, the bulk power supplies comprise dc-to-dc converters. It is also to be understood that the ac-to-dc converter 10 configuration of FIG. 2 is provided by way of example only and that any other suitable ac-to-dc converter configuration may be employed in the power distribution system of the present invention.

In accordance with the present invention, converter control means 18 preferably provides high quality sinusoidal line currents in phase with the applied input line voltage, thereby generating low current harmonics and providing a high power factor. An exemplary converter control means for providing low current harmonics and a high power factor is described in commonly assigned U.S. Pat. No. 4,386,394 of M.J. Kocher and R.L. Steingerwald, issued May 31, 1983 and incorporated by reference herein. Each respective power distribution bus 33-35 is coupled to each point-of-load power supply 42 via an OR gate 44 comprising diodes 46-48. Preferably, each point-of-load power supply 42, with its associated OR gate 44, is mounted on a circuit board with the particular load that it serves. Moreover, each point-of-load power supply 42 is preferably isolated from the power distribution buses 33-35 by fuses 50. Hence, if any of the point-of-load power supplies 42 fails, then none of the other point-of-load power supplies 42 is affected.

Converter control means 18 further preferably comprises current limiting circuitry so that if one of the dc power distribution buses 33-35 becomes short-circuited to ground, then the current therein is limited electronically by the respective bulk power supply 10. In particular, either a constant current or a current foldback method of limiting current may be employed. According to well known constant current limiting schemes, current is limited to a critical value at which output current can no longer be increased and below which output voltage remains constant. On the other hand, in well known current foldback limiting schemes, current is limited to a fraction of the critical value, thereby substantially decreasing distribution wiring dissipation. Exemplary constant current and foldback current circuit configurations are illustrated in *Swtiching and Linear Power Supply, Power Converter Design* by Abraham I. Pressman, Hayden Book Company, Inc., 1977, pp. 183-85, which is incorporated by reference herein. Still another alternative well-known current limiting scheme, often referred to as a "hiccup" current limiting scheme, may be employed wherein the respective bulk power supply turns off when the current reaches a critical value and then restarts a short time thereafter. If the short still exists, then the bulk supply turns off again when the critical current is reached, and the process repeats. Using any suitable current limiting scheme, such as those heretofore mentioned, the dc power distribution buses 33-35 are protected from overcurrents without the need for a multitude of dc circuit breakers. However, if desired, some dc circuit breakers may be employed in order to minimize the size and weight of the distribution buses.

Advantageously, if one or more of the bulk power supplies 10 fails, the point-of-load power supplies 42 are unaffected because they continue to receive input power via the respective OR gates 44. In addition, if one or more of the dc power distribution buses 33-35 becomes short-circuited, then the point-of-load power supplies 42 are likewise unaffected. Furthermore, if a fault occurs on a dc power distribution bus 33-35, then current is supplied by only one of the bulk power supplies, as compared with the system of FIG. 1 wherein such a fault would result in current being supplied by all the bulk power supplies.

For applications wherein the point-of-load power supplies 42 cannot be mounted on the circuit board with the load, a back-plane approach may be used wherein the point-of-load supplies are mounted in slots on the back-plane of a modular assembly as close to the load as possible.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A power distribution system for distributing power to a plurality of point-of-load power supplies, comprising:
   a source of electrical power;
   a plurality of power converters for receiving an input voltage from said source of electrical power and converting said voltage to a dc voltage;
   a separate respective dc power distribution bus coupled to the output of each respective power converter; and
   OR gate means for coupling each respective dc power distribution bus to each respective point-of-load power supply.

2. The power distribution system of claim 1 wherein said source of electrical power is an ac source and said power converters comprise ac-to-dc converters.

3. The power distribution system of claim 2 further comprising converter control means for providing a substantially sinusoidal input current to said power converters that is substantially in phase with said input voltage.

4. The power distribution system of claim 3 wherein said converter control means further comprises current limiting means for limiting current through said power distribution buses.

* * * * *